US012762032B2

(12) United States Patent
Neuberger et al.

(10) Patent No.: US 12,762,032 B2
(45) Date of Patent: Oct. 13, 2026

(54) SPOT INSTANCE INSTABILITY HEATMAPS

(71) Applicant: CAST AI Group, Inc., Miami, FL (US)

(72) Inventors: Joy Neuberger, New York, NY (US); Leonid Kuperman, North York (CA)

(73) Assignee: CAST AI Group, Inc., Miami, FL (US)

( * ) Notice: Subject to any disclaimer, the term of this patent is extended or adjusted under 35 U.S.C. 154(b) by 27 days.

(21) Appl. No.: 19/079,273

(22) Filed: Mar. 13, 2025

(65) Prior Publication Data

US 2025/0291691 A1 Sep. 18, 2025

Related U.S. Application Data

(60) Provisional application No. 63/566,110, filed on Mar. 15, 2024.

(51) Int. Cl.
*G06F 11/30* (2006.01)
*G06F 11/07* (2006.01)

(52) U.S. Cl.
CPC ...... *G06F 11/3006* (2013.01); *G06F 11/0709* (2013.01); *G06F 11/079* (2013.01)

(58) Field of Classification Search
CPC ............ G06F 11/3006; G06F 11/0709; G06F 11/079; G06F 11/0751; G06F 11/301
See application file for complete search history.

(56) References Cited

U.S. PATENT DOCUMENTS

| | | | | |
|---|---|---|---|---|
| 11,595,306 | B2 | 2/2023 | Masnauskas et al. | |
| 11,886,932 | B1 * | 1/2024 | Dasgupta | G06F 9/4812 |
| 12,204,939 | B1 * | 1/2025 | Brown | G06F 11/3433 |
| 2016/0321115 | A1 * | 11/2016 | Thorpe | G06F 11/3409 |
| 2023/0004440 | A1 * | 1/2023 | Hanel | G06F 9/5005 |
| 2024/0311201 | A1 * | 9/2024 | Jha | G06F 9/505 |
| 2025/0254563 | A1 * | 8/2025 | Bagasrawala | H04W 28/084 |

* cited by examiner

*Primary Examiner* — Benjamin M Thieu
(74) *Attorney, Agent, or Firm* — Fenwick & West LLP

(57) ABSTRACT

A system collects data about spot instances across different regions and different cloud service providers and analyzes the collected data to identify any spot instances that have experienced disruptive failures, such as interruptions and failure to provision resources. The system evaluates how stable the spot instances are in each region for each cloud service provider based on the disruptive failures occurred on the spot instances and creates an interactive visual representation of the stability of these spot instances across different regions and cloud service providers.

20 Claims, 12 Drawing Sheets

700

600A

600B

SPOT INSTANCE INSTABILITY HEATMAPS

CROSS REFERENCE TO RELATED APPLICATION

This application claims priority to U.S. Provisional Patent Application Ser. No. 63/566,110, filed Mar. 15, 2024, which is incorporated herein by reference in its entirety.

TECHNICAL FIELD

This disclosure relates generally to determining statuses of spot instances and/or GPU instances in cloud computing environments, and more specifically to detecting and visualizing instability of spot instances and/or GPU instances in near real time.

BACKGROUND

Spot instances offer a flexible option for entities to utilize unused computing capacity in cloud computing. This option allows entities to access these resources without the long-term commitments required by standard on-demand instances. Yet, the availability of spot instances is subject to dynamic fluctuations, driven by the changing supply and demand for computing resources. Increased use of on-demand instances leads to a scarcity of spot instances, while lesser use makes more spot instances available. Likewise, a rise in requests for spot instances diminishes their availability. Should the need for additional resources arise, a cloud service provider may, according to its policies, terminate or pause a spot instance to accommodate an on-demand subscriber's requirements.

Thus, spot instances are particularly advantageous for operations that require substantial computational resources over short periods, such as batch processing, data analytics, or any task that can withstand brief interruptions without significant disruption. These instances offer entities the flexibility to efficiently schedule workloads that have variable timing, enhancing overall operational efficiency.

Nonetheless, the primary drawback is the unpredictability of spot instance availability. This unpredictability stems from the fact that providers can reclaim spot instances at short notice, in response to increased demand from other entities. Despite the flexibility spot instances present, this uncertainty in availability leads many potential entities to hesitate in utilizing spot instances, concerned about the instability and the possibility of abrupt terminations.

Further, recently, GPU instances in cloud computing are crucial for machine learning and artificial intelligence workloads, and high-performance computing. However, these instances face significant availability and stability challenges due to limited supply and high demand. Different cloud service providers offer varying GPU instance types across regions, and some regions lack GPU support entirely. Users lack visibility into where GPU spot instances are most stable and often waste time attempting to provision resources in regions with little to no availability.

SUMMARY

Embodiments described herein include a method and/or system for determining the stability of spot instances and on-demand instances across different regions and cloud service providers and generating an improved user interface that visualizes the determined stability. The visualization provides users with insights into the stability of both spot and on-demand instances across different regions and different cloud service providers, facilitating more informed decision-making for their cloud resource management.

A system collects data regarding spot instances from various regions and across multiple cloud service providers. Once collected, the data is analyzed to identify any spot instances that have experienced disruptive failures. These failures, including interruptions or failures in resource provisioning, are used in assessing the stability of the spot instances. Following the identification of these failures, the system determines the stability levels of spot instances across the different regions for each cloud service provider. In some embodiments, this determination is based on the frequency and nature of the disruptive failures identified earlier. The system then generates a visualization that represents these stability levels across the various regions and cloud service providers. In some embodiments, the visualization is configured to be interactive, allowing users to engage with the data and uncover metrics related to the stability levels of the spot instances.

Figure 1:
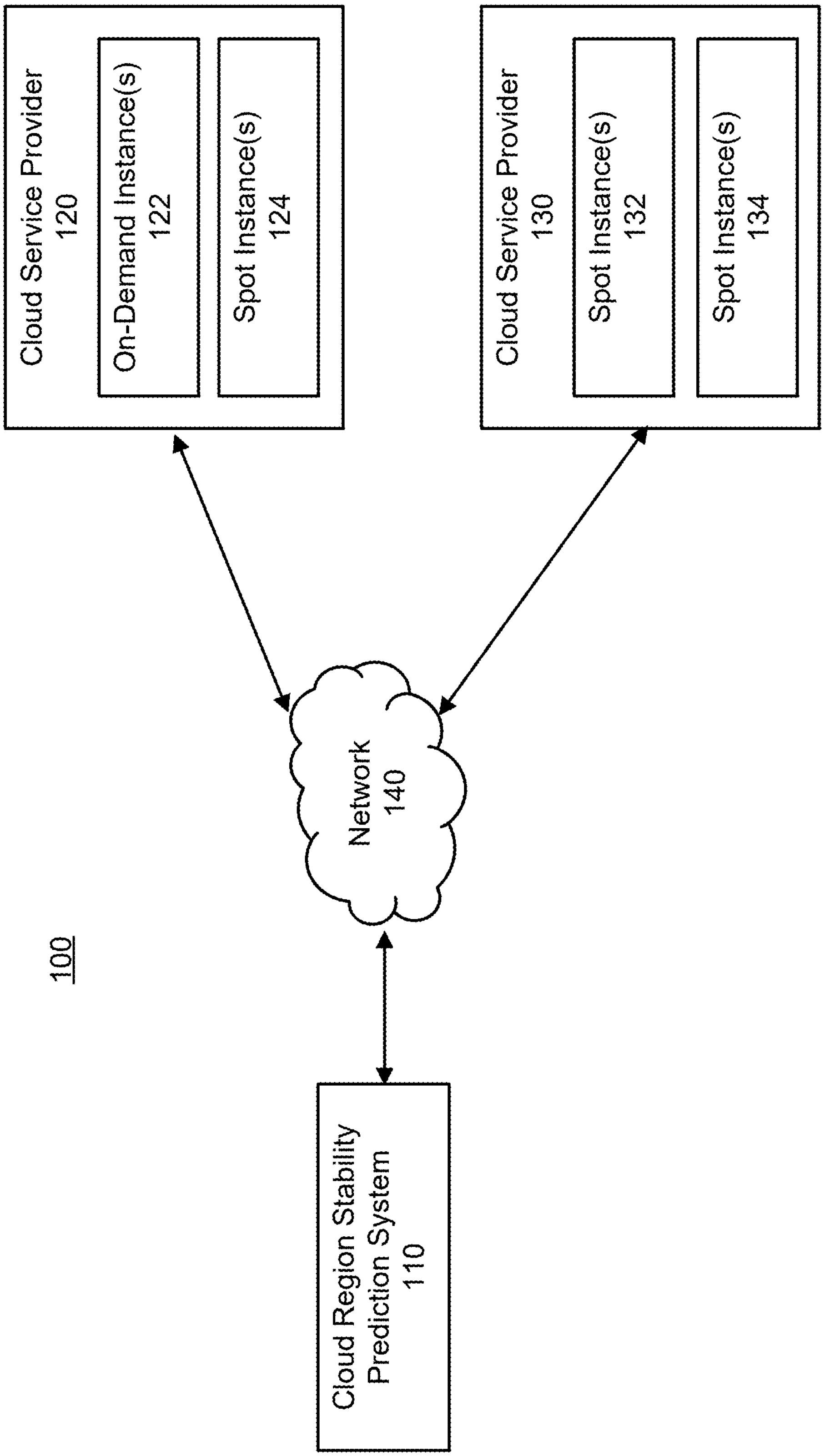
FIG. 1 is a block diagram of a system environment in which an online system, such as a cloud region stability prediction system, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Spot instances in cloud computing offer a dynamic method for accessing unused computing capacity. The primary technical benefit of spot instances is the scalability and flexibility they afford, making them particularly suitable for compute-intensive tasks that can be executed within variable time frames, such as batch processing, data analytics, or any job that can tolerate pauses. This capability allows for efficient resource utilization and can significantly enhance computational throughput for specific applications with low costs.

Conversely, the most significant technical challenge associated with spot instances is their inherent volatility. The possibility of instances being reclaimed by the provider with little to no notice—due to increasing demand from other users—introduces a layer of unpredictability that must be carefully managed. This instability necessitates the design of fault-tolerant systems capable of handling sudden disruptions, which can complicate architecture planning and may impact the reliability of processes dependent on sustained computational resources. Despite the potential flexibility and benefits, this level of unpredictability requires users to balance the advantages against the risk of interrupted operations and the need for robust contingency planning.

The embodiments described herein relate to a method and/or a system that provides a solution for the above-described problem by assessing the stability of spot instances across different regions and cloud service providers within a cloud computing environment based on historical data and presenting a visualization representing these stability levels across the various regions and cloud service providers to users.

In some embodiments, a system collects data regarding spot instances from various regions and across multiple cloud service providers. Once collected, the data is analyzed to identify any instances (such as on-demand instances and/or spot instances) that have experienced disruptive failures. These failures, including interruptions or failures in provisioning resources, are used in assessing the stability of the spot instances. Following the identification of these failures, the system determines the stability levels of spot instances across the different regions for each cloud service provider. In some embodiments, this determination is based on the frequency and nature of the disruptive failures identified earlier. The system then generates a visualization that represents these stability levels across the various regions and cloud service providers. In some embodiments, the visualization is configured to be interactive, allowing users to engage with the data and uncover metrics related to the stability levels of the spot instances.

In some embodiments, the data is collected through instantiation of agents on cloud resources. These agents are tasked with monitoring the performance and stability of the spot instances, collecting relevant data, and sending it to the system for further analysis.

In some embodiments, processing the collected data includes extracting features related to disruptive failures and filtering these features to identify instances prone to interruptions or provisioning failures. The features considered may include (but are not limited to) timestamps of interruptions, reasons for interruptions, timestamps of refusal of provisioning requests, and the types of resources requested, offering a view of the issues encountered.

In some embodiments, the system uses a machine learning model trained on historical data to predict future capacity and stability for a given region and cloud service provider, providing foresight into potential stability and stability issues. In some embodiments, based on the determined stability levels, the system provides recommendations based on the most reliable regions and cloud service providers for using spot instances. This guidance is invaluable for entities looking to optimize their cloud resource utilization while minimizing the risk of disruptions.

Additional details about the system and method for collecting and analyzing data about spot instances across different regions and cloud service providers are further described below with respect to FIGS. 1-7.

System Architecture

FIG. 1 is a block diagram of a system environment 100 in which an online system, such as a cloud region stability prediction system 110, as further described below in conjunction with FIGS. 2-7, operates. The system environment 100 shown by FIG. 1 comprises a cloud region stability prediction system 110 ("the system"), a plurality of cloud service providers 120, 130, and a network 140. In alternative configurations, different and/or additional components may be included in the system environment 100. The cloud service providers 120 and 130 may include (but are not limited to) Amazon Web Service (AWS), Microsoft Azure, and Google Cloud service provider (GCP). Additional details about cloud service providers and Kubernetes clusters are described in U.S. patent application Ser. No. 17/380,729, filed Jul. 20, 2021 (now issued as U.S. Pat. No. 11,595,306), which is attached herein as Appendix I and incorporated in its entirety.

The cloud service providers 120, 130 offer both on-demand instances 122, 132, and spot instances 124, 134. On-demand instances 122, 132 allow entities to pay for compute capacity by the hour or second (depending on the cloud service provider). Entities can launch an on-demand instance at any time and use it for as long as they need, making on-demand instances an ideal option for applications with unpredictable workloads that cannot be interrupted. Spot instances 124, 134 offer unused computing capacity at significantly lower prices compared to on-demand rates. However, these instances can be reclaimed by the cloud service provider with very short notice if there is an increase in demand or the current spot price exceeds your maximum bid. Spot instances are suitable for flexible, interruption-tolerant applications, such as batch processing jobs, background tasks, and workloads that can be quickly checkpointed and resumed. Pricing for on-demand instances is higher compared to spot instances due to their guaranteed availability.

The system 110 is configured to obtain data regarding spot instances 124, 134 on cloud service providers 120, 130 over the network 140. The spot instances 124, 134 may be hosted at various regions. The data regarding spot instances obtained by system 110 includes such location data. Once collected, the system analyzes the data to identify any spot instances 124, 134 that have experienced disruptive failures. These failures, including interruptions or failures in resource provisioning, are used in assessing the stability of the spot instances 124, 134 in different regions of different cloud service providers 120, 130. Following the identification of these failures, the system 110 determines the stability levels of spot instances 124, 134 across the different regions for each cloud service provider 120, 130. In some embodiments, this determination is based on a frequency and nature of the disruptive failures identified earlier. The system 110 then generates a visualization that represents these stability levels across the various regions and cloud service providers. In some embodiments, the visualization is configured to be interactive, allowing users to engage with the data and uncover metrics related to the stability levels of the spot instances 124, 134.

In some embodiments, the data is collected through deployment of agents on spot instances 124, 134. These agents are tasked with monitoring the performance and stability of the spot instances 124, 134, collecting relevant data, and sending it to the system 110 for further analysis. In some embodiments, processing the collected data includes extracting features related to disruptive failures and filtering these features to identify instances prone to interruptions or provisioning failures. The features include, but are not limited to, timestamps and locations of interruptions, reasons for these interruptions, timestamps and locations where provisioning requests were refused, the types of resources requested, and reasons for these refusals, thereby providing insight into the encountered issues.

In some embodiments, the system uses a machine learning model trained on historical data to predict future capacity and stability for a given region and cloud service provider 120, 130, providing foresight into potential stability and stability issues. In some embodiments, based on the determined stability levels, the system 110 provides recommendations regarding the most reliable regions and cloud service providers 120, 130 for using spot instances 124, 134. This guidance is invaluable for entities looking to optimize their cloud resource utilization while minimizing the risk of disruptions.

Figure 2:
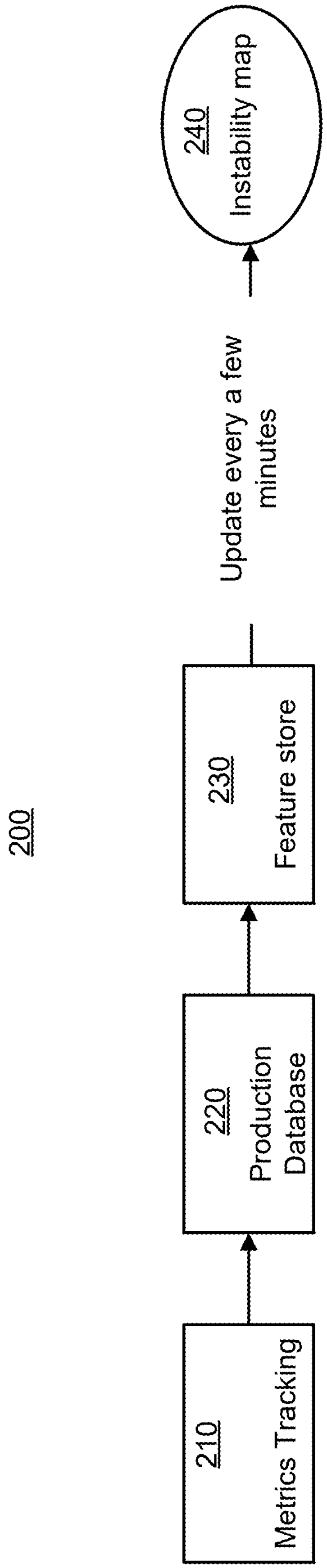
FIG. 2 is a flowchart illustrating an example process of generating a map that visualizes stability or instability within cloud regions, in accordance with one or more embodiments.

FIG. 2 is a flowchart illustrating an example process 200 of generating an instability map in accordance with one or more embodiments. The process 200 includes collecting and tracking 210 operational metrics as time-series data from different spot instances (e.g., spot instances 124, 134) across different cloud service providers (e.g., cloud service providers 120, 130). In some embodiments, the data collection may be performed via a data collection application configured to employ a pull model to collect and monitor resources and generate alerts in the cloud computing environment. The data collection application may be an open source application, such as (but not limited to) Prometheus, or a proprietary application provided by the system 110.

The operational metrics may include (but are not limited to) spot instance stability, measuring the stability of spot instances over time; cost savings, tracking the cost savings from using spot instances versus on-demand instances; resource utilization, monitoring CPU, memory, disk, and network usage of spot instances; instance interruptions, tracking times when spot instances are interrupted by the cloud service provider; reclamation time, tracking the duration from when a spot instance is reclaimed to when it becomes available again; provisional failures, tracking times when a request to provision resources at a spot instance fails; failure rates, monitoring the rate of failed spot instance requests; and provisioning latency, measuring the time to provision or start a spot instance after a request.

After the data is collected, the data is stored relationally in a database 220. In some embodiments, the database 220 may be an open source database, such as (but not limited to) a product PostgreSQL database. Alternatively, the database 220 may be a proprietary database provided by the system 110. The collected data stored in the database may then be analyzed to generate features, which are, in turn, stored in a feature store 230. In some embodiments, the feature store is a Feast feature store, which is a feature store that aims to simplify the management and use of features for real-time predictions. The features stored in the feature store 230 are periodically updated (e.g., every few minutes) and used to generate an updated instability map 240.

Figure 3:
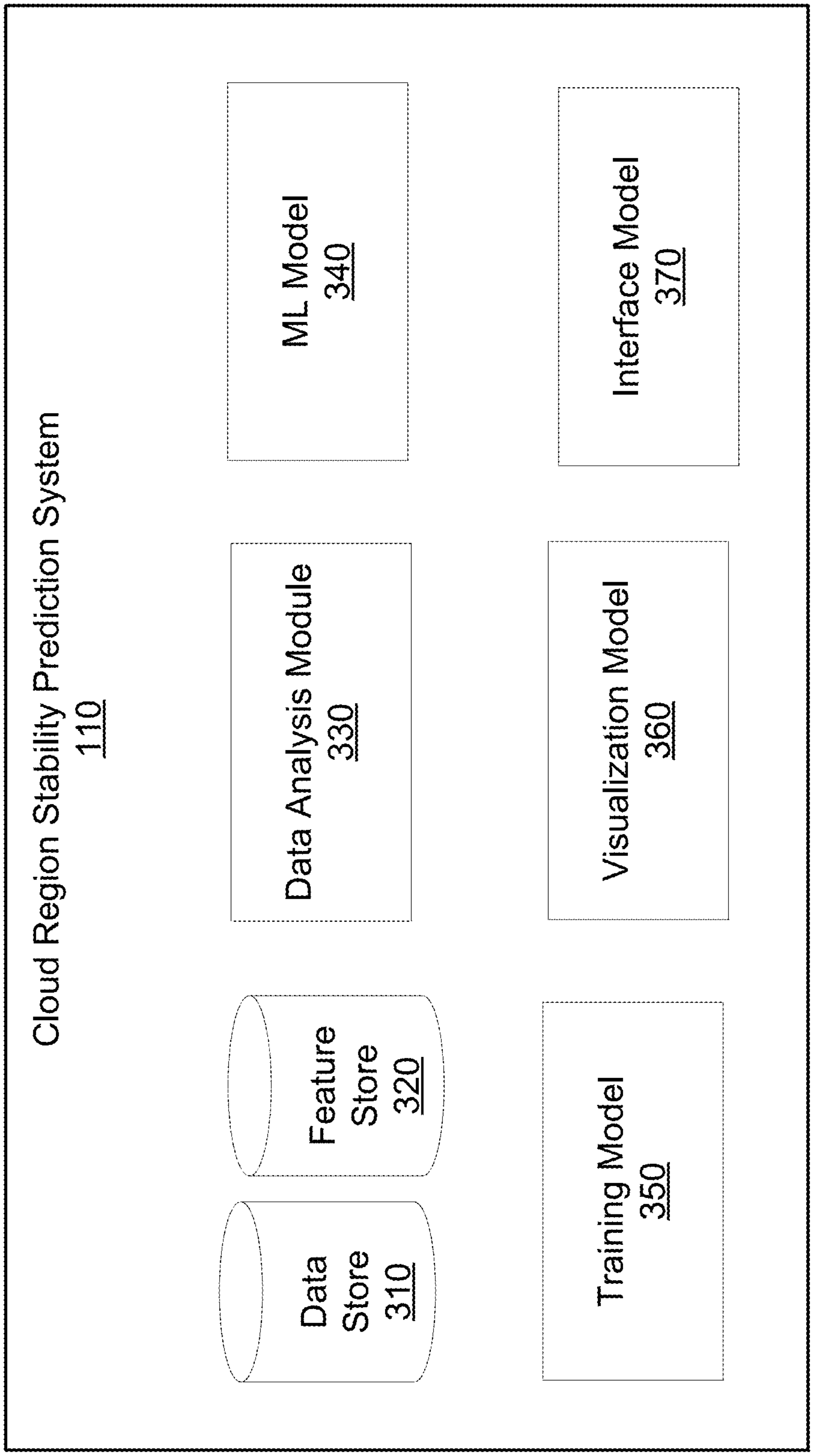
FIG. 3 illustrates an example architecture of the cloud region stability prediction system in accordance with one or more embodiments.

FIG. 3 illustrates an example architecture of the cloud region stability prediction system 110 ("the system") in accordance with one or more embodiments. The system 110 includes a data store 310, a feature store 320, a data analysis module 330, one or more machine learning models 340, a training module 350, a visualization module 360, and an interface module 370. The data store 310 is configured to store data collected from spot instances (e.g., spot instances 124, 134) across different regions and cloud service providers (e.g., cloud service providers 120, 130). The data store 310 may be a relational database, such as (but not limited to) an SQL database or a PostgreSQL database. The data may include (but are not limited to) spot instance stability, tracking the stability of spot instances over time; resource utilization, tracking CPU, memory, disk, and network usage of spot instances; instance interruptions, tracking when spot instances are interrupted by the cloud service provider; and provisional failures, tracking times when a request to provision resources at a spot instance fails.

The data analysis module 330 extracts features from the data in the data store 310. These features may include (but are not limited to), for each region and availability zone (AZ) of a cloud service provider, a number of interruptions that spot instances experience within a specific time window; an average reclamation time, which is an average duration from when a spot instance is reclaimed by the cloud service provider to when it becomes available again; insufficient capacity errors, which indicate failures due to resource unavailability rather than just general failed requests for spot instances; provisioning latency, which is the time required to provision or start a spot instance after making a request; and cost savings, tracking the cost savings from using spot instances compared to on-demand instances. The feature store 320 is configured to store features extracted from the data stored in the data store 310.

The training module 350 is configured to use the features stored in the feature store 320 to train one or more machine-learning models 340. In some embodiments, the training module 350 is configured to train a machine-learning model 340 to predict cloud instance capacities, demand trends, and/or prices at a given region and a given cloud service provider. In some embodiments an ARIMA (AutoRegressive Integrated Moving Average) model is trained for forecasting future data points by considering past values in a time series. ARIMA models are well-suited for predicting cloud instance demand trends and/or prices. In some embodiments, a seasonal ARIMA model is trained to further account for seasonality in data. Given cloud usage and demand can exhibit seasonal patterns (e.g., higher demand during business hours), SARIMA may be able to provide more accurate forecasts for certain regions and/or cloud service providers, considering the seasonality in data. Linear regression, random forest regression, deep learning models, such as long short-term memory (LSTM) networks, gated recurrent units (GRU), and/or hybrid models may also be trained to forecast spot instances' usage, demand, and cost over time.

The visualization module 360 is configured to generate a visualization that represents the features or predicted results generated by the machine learning models 340. In some embodiments, the visualization takes the form of a heatmap, which indicates the stability or instability levels of different regions on a given cloud service provider. The stability or instability levels may be represented by different colors. For example, a darker shade of a color may represent a higher instability level, and a lighter shade of a color may represent a lower instability level.

In some embodiments, the regions are not represented as contiguous areas, but scattered points across the map. A size of the point (e.g., a diameter of a circle) represents the number of availability zones in the corresponding region. In some embodiments, the visualization is interactive, enabling users to engage with it. For example, the user interface may detect a user interaction, such as hovering over or clicking a specific region of the heatmap to select the region. In response to the detection of this user interaction, a pop-up bubble may be generated, presenting additional metrics, predictions, or recommendations related to the selected region. The interface module 370 is configured to cause the visualization to be displayed at a client device of a user, and receive user interaction from the client device.

Figure 4:
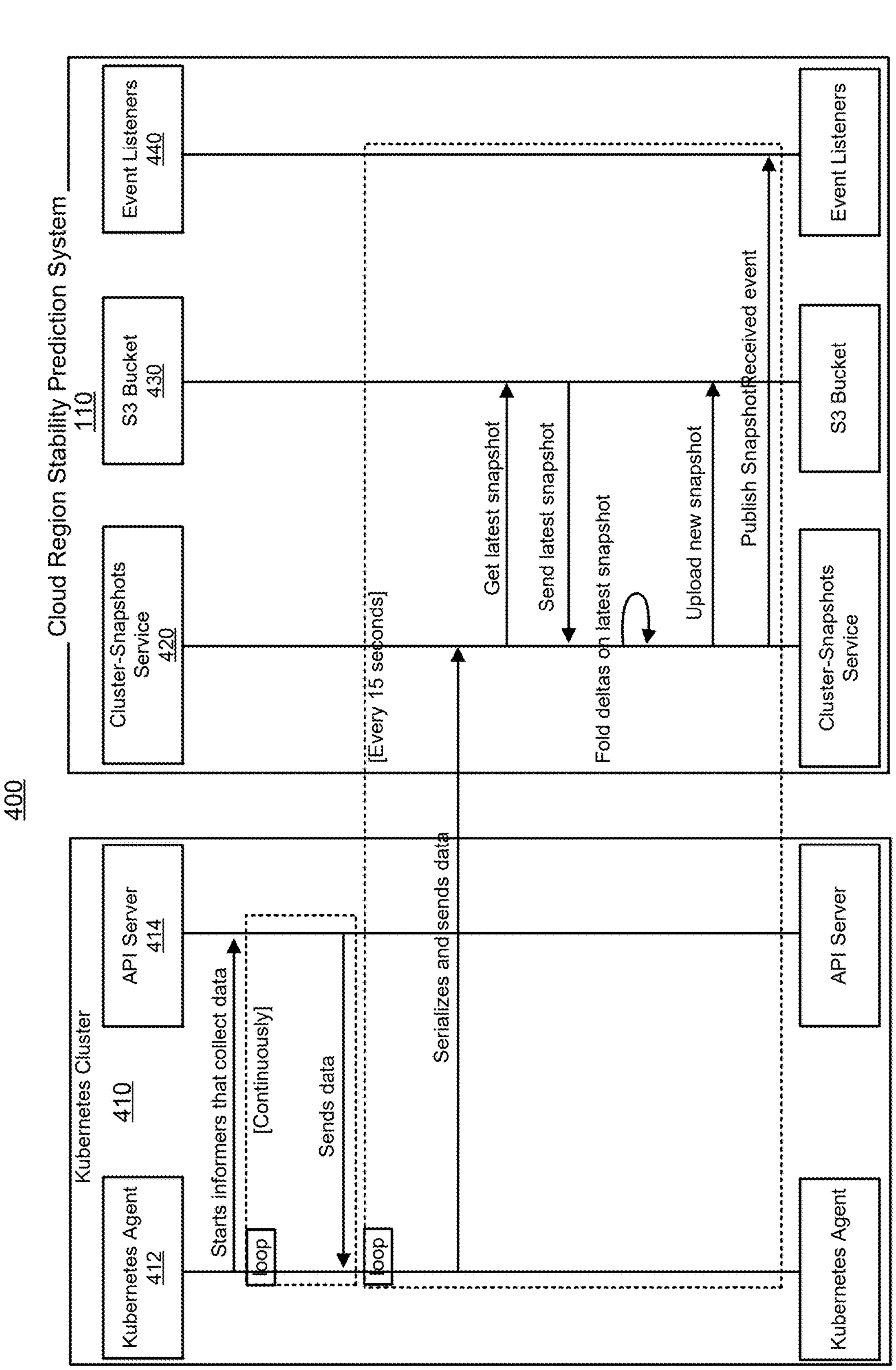
FIG. 4 illustrates an example environment in which a Kubernetes agent within a Kubernetes cluster is configured to serialize and send serialized data to a cloud region stability prediction system, in accordance with one or more embodiments.

FIG. 4 illustrates an example environment 400 in which a Kubernetes agent 412 inside a Kubernetes cluster 410 is configured to serialize data and send the serialized data to system 110 in accordance with one or more embodiments. The Kubernetes cluster 410 is created on a spot instance of a cloud service provider. A Kubernetes cluster includes a Kubernetes agent 412 and an API server 414. The cloud region stability prediction system 110 includes a cluster snapshots service 420, an S3 bucket 430, and event listeners 440.

The API server 414 acts as a front-end, allowing users, different parts of the Kubernetes cluster 410 (such as the Kubernetes agent 412), and external components to communicate with the cluster 410. The Kubernetes agent 412 is configured to interact with the Kubernetes API server 414. The Kubernetes agent 412 causes the Kubernetes API server 414 to start informers that collect data. Informers are components in Kubernetes cluster 410 configured to watch registered events, such as (but not limited to) creation, updating, and deletion of resources. The Kubernetes API server 414 passes the collected data to the Kubernetes agent 412, which in turn passes the received data to the cluster snapshots service 420 of the system 110. As illustrated, the Kubernetes agent 412 is configured to serialize the received data and sends the serialized data to the cluster snapshots service 420 periodically, such as (but not limited to) every few seconds, e.g., 15 seconds, every few minutes, etc. The data may include (but are not limited to) data associated with spot instance stability, resource utilization, such as CPU, memory, disk, and network usage of spot instances, instance interruptions, and provisional failures.

The cluster snapshots service 420 is configured to receive the time-series data from Kubernetes agents on different Kubernetes clusters (e.g., Kubernetes agent 412) on spot instances across different regions and different cloud service providers. The cluster snapshots service 420 determines whether the new time-series data has changed since the last snapshot. If they are not the same, the cluster snapshots service 420 generates a new snapshot based on the new time-series data. Once the new snapshot is generated, the cluster snapshots service 420 sends it to the S3 bucket 430 for storage. S3 bucket 430 is a storage configured to archive historical snapshots received from the cluster snapshots service 420.

In some embodiments, as illustrated in FIG. 4, upon receiving new time-series data from the Kubernetes agent 412, the cluster snapshots service 420 sends a request for the latest previous snapshot archived at the S3 bucket 430, prompting the S3 bucket to fetch and forward the latest previous snapshot back to the service 420. At this point, the cluster snapshots service 420 possesses both the new time-series data and the latest previous snapshot. The service 420 is configured to compare the new time-series data with the latest previous snapshot to identify any changes in the new time-series data. Upon detecting changes, the cluster snapshots service 420 generates a new snapshot using the new time-series data and sends this new snapshot to the S3 bucket 430 for storage. Additionally, the cluster snapshots service 420 announces a snapshot-received event to the event listeners 440.

Figure 5:
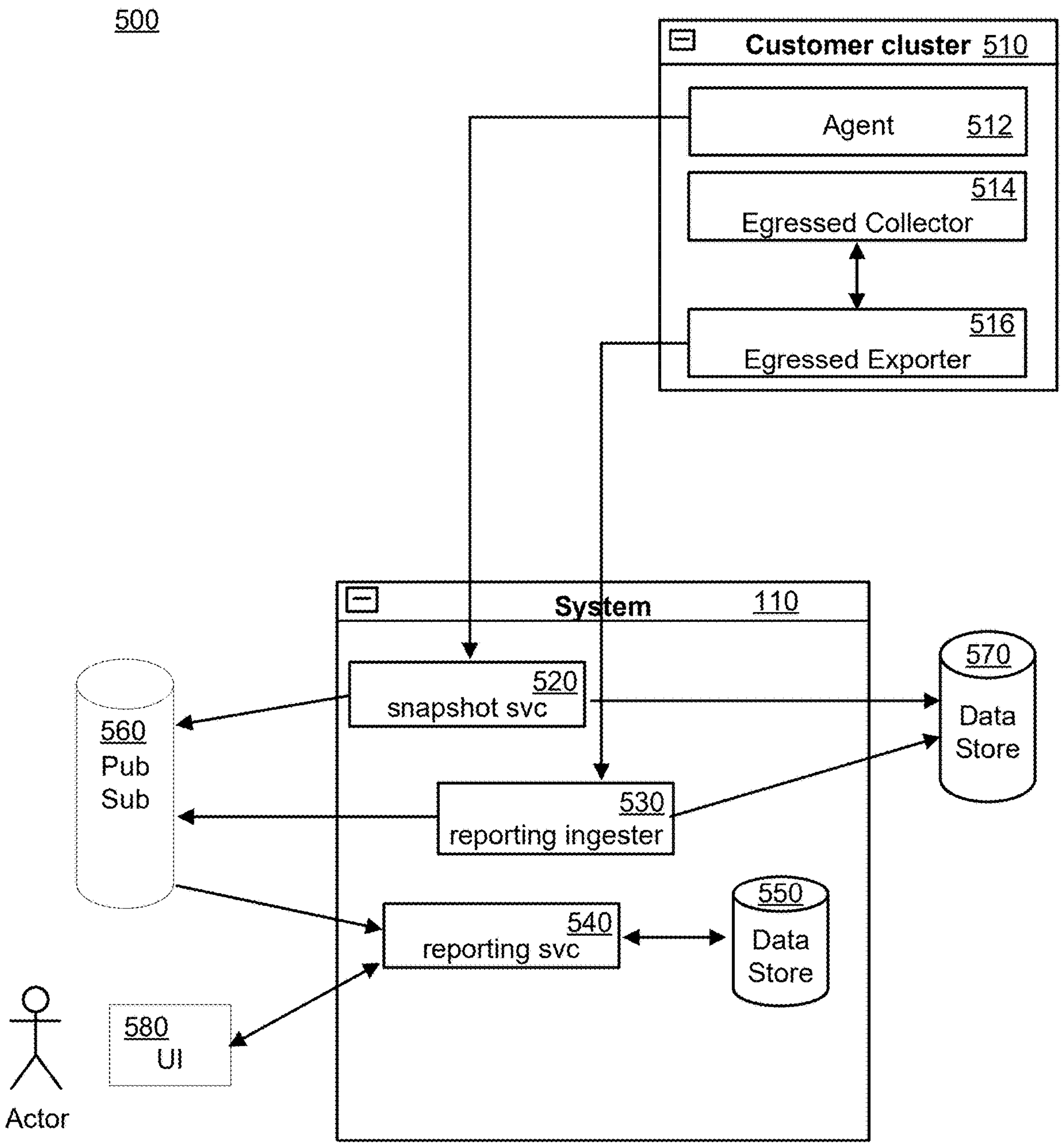
FIG. 5 illustrates another example environment, in which an agent facilitates data collection within a cluster and transmits the collected data to a cloud region stability prediction system in accordance with one or more embodiments.

FIG. 5 illustrates another example environment 500, in which an agent within a cluster facilitates data collection in the cluster and data transmission to the cloud region stability prediction system 110 in accordance with one or more embodiments. This cluster 510 may be a Kubernetes cluster established on a spot instance within a cloud service provider. The cluster 510 includes an agent 512, an egress collector 514, and an egress exporter 516. The agent 512 causes the egress collector 514 to collect data. Upon collecting the data, the egress collector relays this data to both the egress exporter 516 and back to the agent 512.

The system 110 includes a snapshot service 520, a reporting ingester 530, a reporting service 540, and a database 550. The agent 512 is configured to serialize the data and send it to the snapshots service 520, which then passes the data to both a publish-subscribe (PubSub) system 560 and a storage 570 (such as a GCS database) for archive. The egress exporter 516 is configured to transmit the collected data to the reporting ingester 530. The data transmission from the agent 512 and/or the egress exporter 516 may be triggered by specific events, on a predetermined schedule or in real-time, based on their configurations. Upon receipt, the reporting ingester 530 undertakes a series of processing tasks, which may include (but not limited to) data validation, transformation (such as data formatting and aggregation), and enrichment (such as appending metadata). Post-processing, the reporting ingester 530 causes the data to be published in the PubSub system 560 and its archival in the storage 570, enabling both real time accessibility and persistent storage.

Upon receiving data from the reporting ingester 530, the PubSub system 560 broadcasts the data to assorted subscribers according to their respective subscriptions. The broadcasting is performed via the reporting service 540. The reporting service 540 is configured to process and/or aggregate the data from the PubSub system 560 to prepare it for reporting objectives. The reporting service 540 is configured to produce reports (including heatmaps) and to display these reports on a user interface (UI) 580. Moreover, the reporting service 540 causes the generated reports to be stored in a database 550 for archiving. In some embodiments, the database 550 may be an open source database, such as (but not limited to) a Mimir database. Alternatively, the database 550 may be a proprietary database provided by the system 110. In some embodiments, the database 550 allows the reporting service 540 to retrieve historical data or metrics for inclusion in reports or heatmaps or for trend analysis over time.

GPU Instances Availability Optimization

As described above, spot instances are virtual machines (VMs) offered by cloud providers when consumption of on-demand instances are low, but their availability is subject to supply and demand fluctuations. Most instances include CPUs and some instances include GPUs. However, the availability of GPUs is limited and depends on the cloud provider, region, and current demand. Unlike CPU-based instances, which are generally available across most regions, GPU instances may not be available in every region, and even in the regions with GPU instances, GPU instances have supply constraints.

Cloud computing environments, such as Kubernetes-managed infrastructures, manage computational resources such as CPU, GPUs, memory. GPUs are particularly valuable for artificial intelligence (AI) and machine learning (ML) applications but suffer from limited availability due to competitive demand. Users or applications may struggle to efficiently select the most optimal cloud regions for GPU allocation due to a lack of clear comparative metrics across different cloud providers.

The system 110 described herein is also able to perform GPU resource management in cloud environments. The system 110 provides a dynamic GPU availability tracking mechanism that visualizes GPU availability across multiple cloud regions and enables proactive provisioning of resources based on real-time and historical GPU utilization data.

The system 110 determines a metric called the "availability ratio," which quantifies a number of GPU instances offered in a given cloud region relative to all possible GPU instances provided by the cloud provider. This metric provides a clear comparative insight into GPU accessibility across different cloud providers and geographic locations, assisting users and/or applications in making informed deployment decisions.

The system 110 also implements a dynamic color-coded mapping interface that updates in real time. In some embodiments, green zones indicate regions with higher availability, yellow zones represent moderately available, while red zones highlight areas with low availability. Gray zones indicate regions where no GPUs are currently available. This visual representation assists cloud users in selecting the most efficient regions for their compute-intensive workloads. Example GUIs are further described below with respect to FIG. 6A-6E.

In addition to real-time monitoring, in some embodiments, the system 110 is configured to incorporate predictive analytics for GPU availability based on historical demand trends. This predictive analytics feature enables proactive GPU allocation strategies and reduce resource bottlenecks, enhancing performance for AI/ML applications.

In some embodiments, the system 110 collects GPU availability data from multiple cloud service providers (CSPs), including AWS®, Google Cloud Platform (GCP)®, and Microsoft Azure®. For each region of a CSP, the system 110 determines a number of GPU instance types accessible in the region of the CSP relative to the total number of possible GPU instance types. For example, if GCP offers 40 different GPU instances, but only 10 are offered in a given region, the availability ratio for that region would be 25%. In some embodiments, this metric is provided to users, allowing users to assess whether deploying in a given region is viable. Alternatively, the system 110 automatically selects a region based on requirement of an application and the metrics of different regions of the different CSPs.

In some embodiments, the system 110 interacts with public and/or private APIs provided by CSPs to gather real-time data about available compute instances, including GPU instances. These APIs are configured to return real-time metrics such as a number of GPUs currently available in a region and instance configuration. The instance configuration includes specifications of available GPU-enabled VM instances (e.g., memory, vCPUs, vGPUs, disk storage, etc.). In some embodiments, the system 110 performs API requests periodically, e.g., every minute, every 5 minutes, hourly, etc. The collected data is visualized in real time or near real time. In some embodiments, the collected data is stored and aggregated to detect trends in GPU availability over time.

In some embodiments, the system 110 performs API requests in response to detection of certain events, such as notifications from CSP event streams, such as AWS EventBridge, GCP Pub/Sub). For example, a user attempts to launch a GPU instance and fails due to an insufficient capacity error. In response to this failure event, the system 110 can re-query the API to confirm the latest availability.

As described above, each CSP divides its infrastructure into multiple geographic regions. For example, AWS operates in over 30 regions worldwide, GCP operates in about 40 regions worldwide, and Azure operates in over 60 regions worldwide. Each region includes multiple availability zones (AZs). These AZs are physically separate datacenters within a region that provide high availability, fault tolerance, and redundancy. In the same region, each AZ is isolated from failure in other AZs but is connected to them with low-latency networking. For example, each AZ has independent power, cooling, and networking to withstand failures in other AZs.

In some embodiments, to obtain AZ-specific data, the system 110 may perform API requests to obtain all regions for each CSP, and perform API requests iteratively to obtain all AZs for each region. For each AZ, the system 110 can perform API requests to obtain instance availability data associated with each AZ in each region.

In some embodiments, instead of querying regions or AZs sequentially, the system 110 is configured to send multiple API requests in parallel to reduce latency. In some embodiments, to reduce unnecessary API calls, the system 110 may request data for instance types that support GPUs at a first frequency, and request data for all other instance types in a second frequency different from the first frequency. In some embodiments, the system 110 prioritizes queries for regions with high demand or recent failures. For example, for a region with high demand or high recent failures, the system 110 performs API requests more frequently (e.g., at a first frequency) in this region; on the other hand, for another region with low demand or low recent failures, the system 110 performs API requests less frequently (e.g., at a second frequency lower than the first frequency) in this other region.

In some embodiments, the system 110 further integrates spot instance interruption tracking, insufficient capacity error reports, and real-time pricing data to provide a comprehensive GPU monitoring solution. These features empower users to make informed decisions when selecting cloud regions and/or CSPs for AI/ML workloads, helping users balance resource consumption efficiency and availability.

In some embodiments, the system 110 is configured to automatically select an optimal region to provision GPUs based on real-time availability and user-defined constraints. The user-defined constraints may include (but are not limited to) budget limits, latency requirements, energy efficiency preferences, compliance with regional data governance policies, and/or preferred CSPs.

In some embodiments, the system 110 integrates machine learning algorithms to predict GPU availability trends based on historical usage patterns. The system 110 is configured to proactively allocate resources, minimizing downtime and optimizing compute resource management. Given the widespread adoption of GPUs for AI/ML applications and the increasing constraints on GPU availability, the embodiments described herein provide a valuable tool for optimizing resource allocation in cloud computing environments.

Example Graphical User Interface (GUI).

Figure 6A:
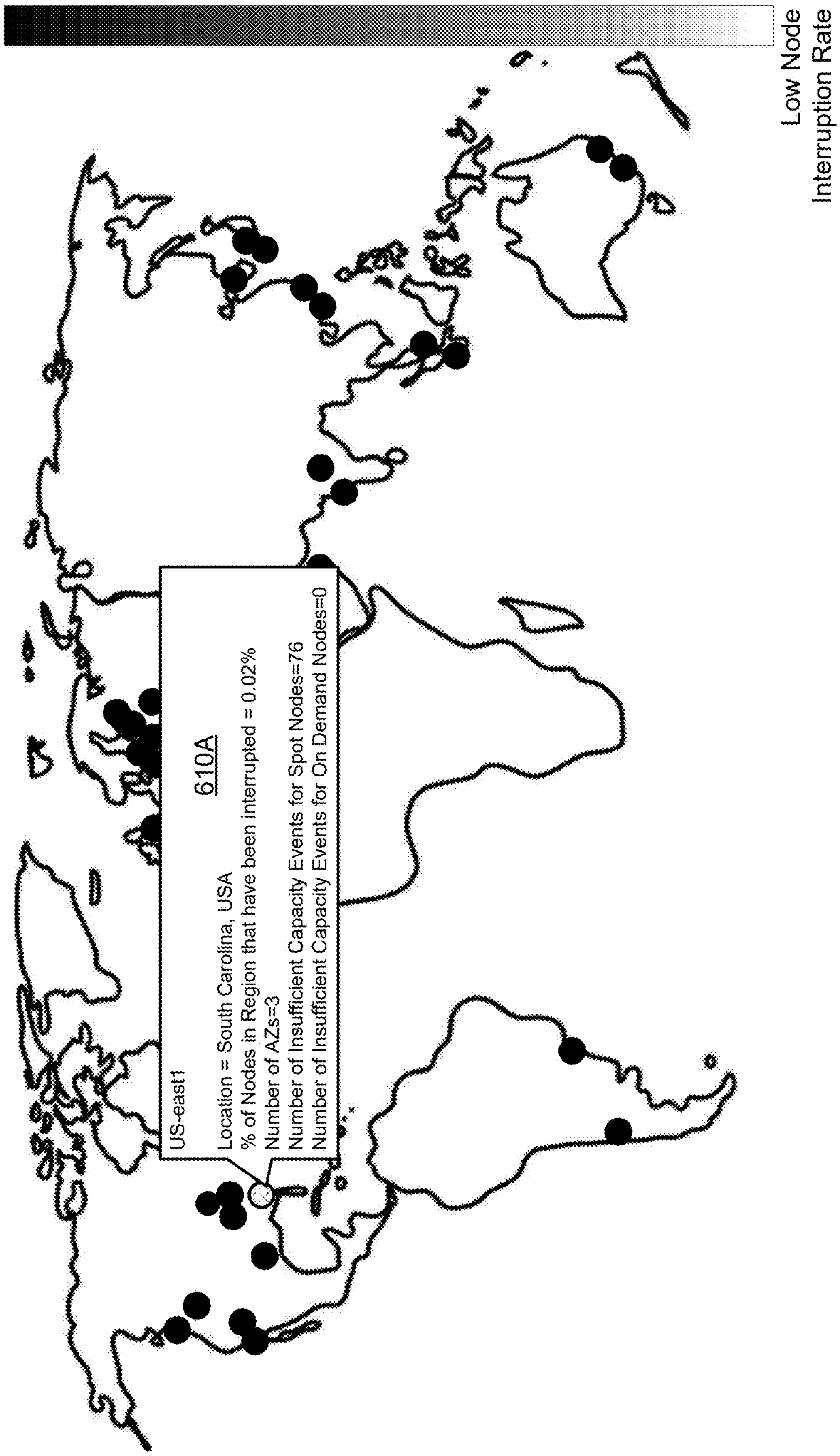
FIG. 6A-6E illustrate examples of user interface (UI) generated based on the data collected from spot instances across different regions of a cloud service provider in accordance with one or more embodiments.

FIG. 6A illustrates an example user interface (UI) 600A generated based on the data collected from spot instances across different regions of a cloud service provider (e.g., GCP) in accordance with one or more embodiments. The UI 600A includes a map showing different regions where GCP provides spot instances. Notably, these regions are not as contiguous areas but as scattered points, each marked by a dot. In some embodiments, a diameter of each dot represents a capacity at that location, for instance, a number of spot instances available at the location or the number of availability zones available at the location. In some embodiments, a color of each dot represents a stability level of the spot instances at the location. In some embodiments, the map is interactive. For example, when a mouse hovers over a region or clicks on a region, the region changes its color, and the changed color represents the stability or instability of spot instances in the region. Alternatively, or in addition, responsive to receiving a user interaction, additional metrics associated with the region are displayed as a pop-up window 610A, as shown in FIG. 6A.

Additionally, as the system 110 continuously monitors the stability levels of spot instances across various regions, the UI 600A is dynamically updated to reflect changes in these stability levels. For instance, in some embodiments, there are rankings panels in the map that contain the top three most and least interrupted regions. These rankings fluctuate constantly over time. Similarly, changes in the stability levels of a region can result in modifications to the region's color on the map. Furthermore, other metrics specific to each region are subject to change as well. Consequently, when the UI 600A is interacted with at different times, it displays metrics that are relevant to the current moment, providing users with up-to-date information.

By dynamically representing the capacity and stability of spot instances in various regions through visual means (varying dot diameters for capacity and colors for stability) and updating these in real-time as conditions change, the UI provides an immediate, intuitive understanding of complex data that was not previously available. This improvement in data visualization and interaction can enhance decision-making processes for entities and applications to manage cloud resources, representing a specific improvement in the technology of cloud service management.

Figure 6B:
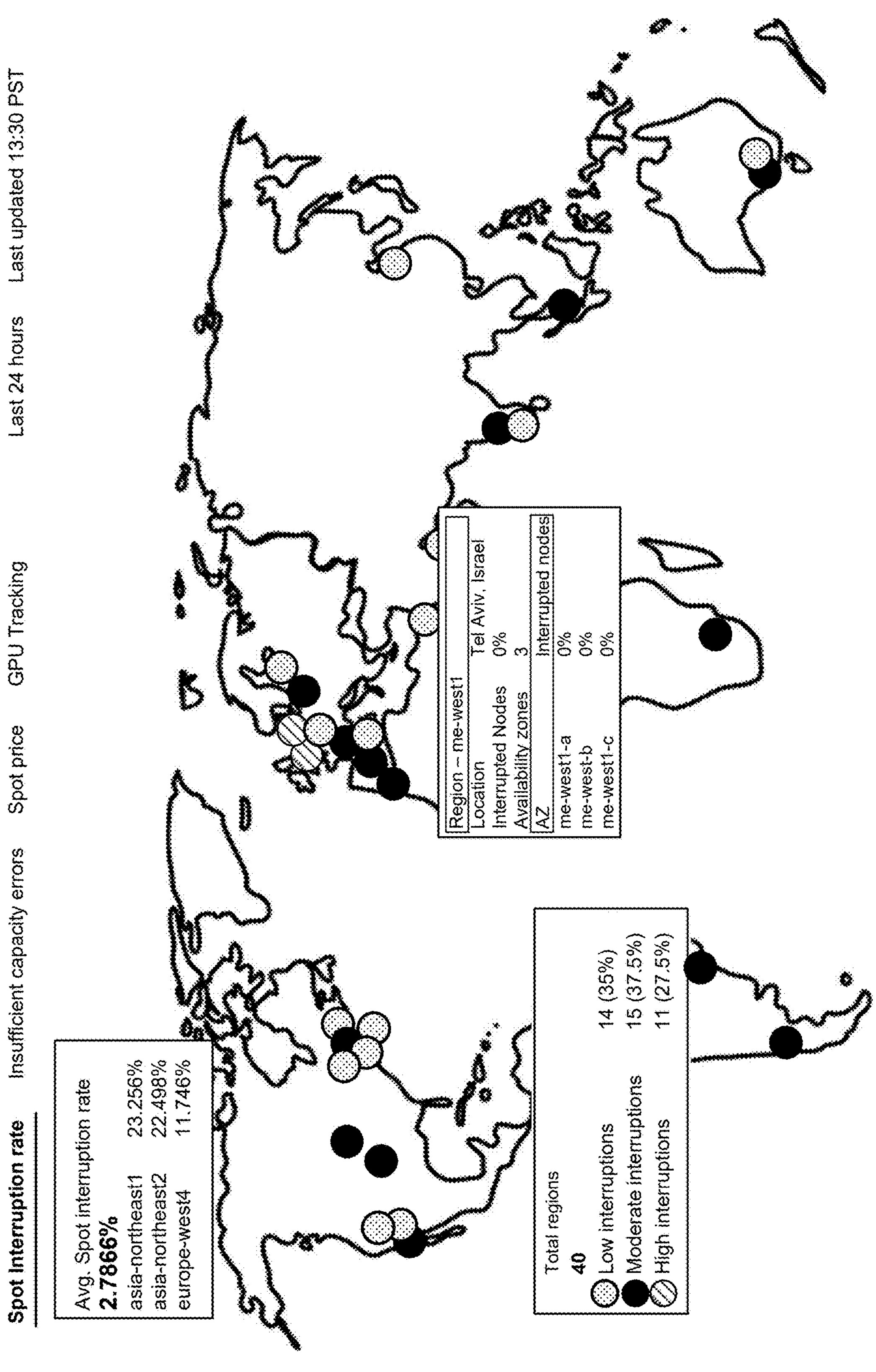

FIG. 6B illustrates an example GUI 600B, displaying spot interruption rates across different regions for a CSP (e.g., GCP) in accordance with one or more embodiments. GUI 600B includes an interactive map displaying spot interruption data across different regions. Each region is represented by a color-coded dot, e.g., green indicates low interruptions, orange indicates moderate interruptions, and red indicates high interruptions. A user can interact with the map, e.g., hovering over or clicking a dot corresponding to a specific region to see the metrics of that specific region. For example, when a user interacts with the dot corresponding to the me-west1 region (Tel Aviv, Israel), metrics associated with availability zones in that region pop up. Here, there are three availability zones (namely, me-west1-a, me-west1-b, and me-west1-c) in the me-west1 region.

The GUI 600B also includes a metric panel that shows average spot interruption rate and top three regions with the highest spot interruptions. The GUI 600B also includes a total regions breakdown. For example, total 40 regions (32.5%) of GCP are monitored. The 40 regions are categorized by interruption levels, including 13 regions (32.5%) with low interruptions (green), 11 regions (27.5%) with moderate interruptions (orange), and 16 regions (40%) with high interruptions (red). Notably, this GUI 600B shows 40 regions of GCP. Users can toggle the drop down list to select a different CSP, e.g., AWS or Azure to see their regions and spot interruptions data.

Figure 6C:
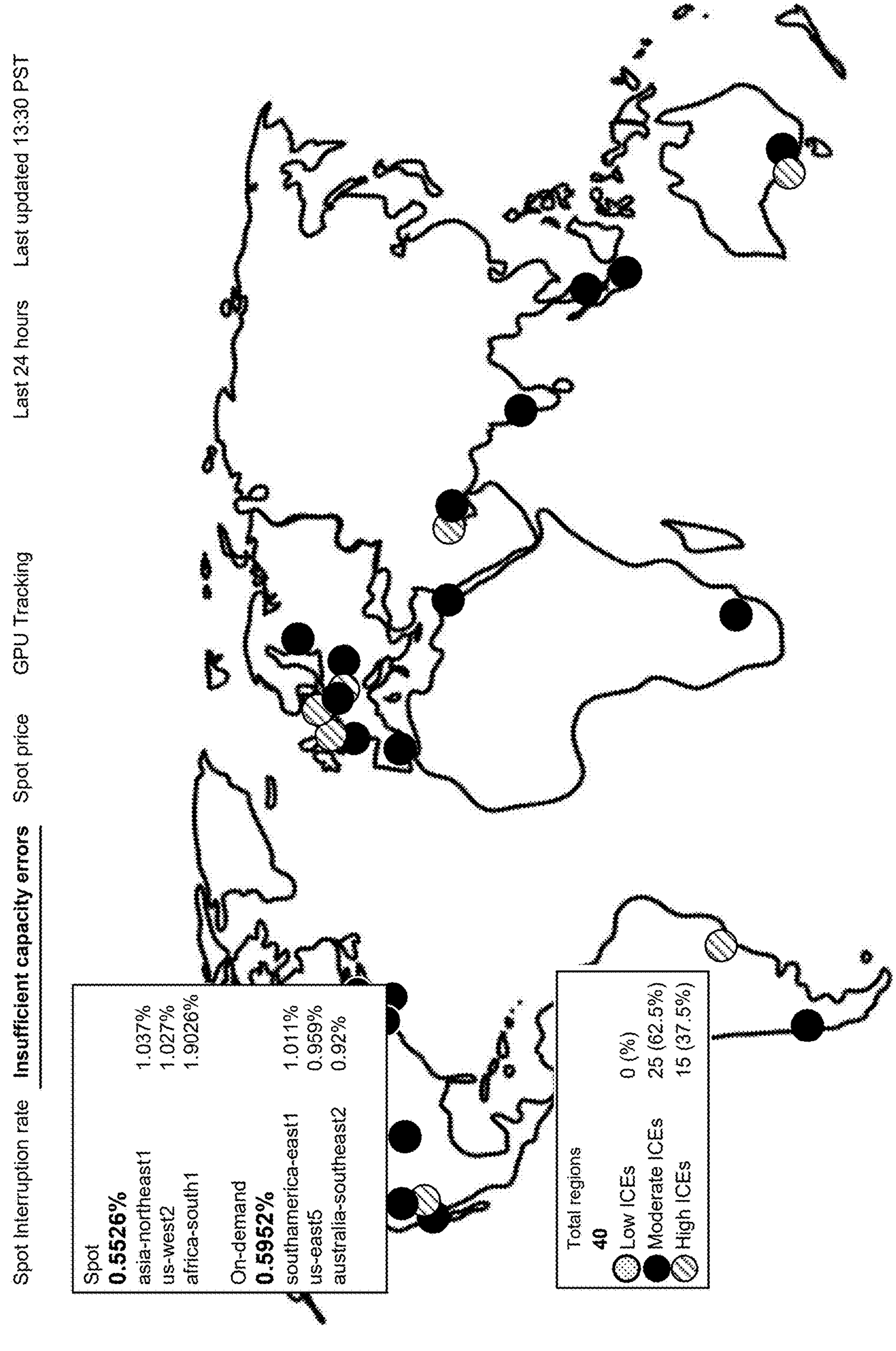

FIG. 6C illustrates an example GUI 600C displaying insufficient capacity errors (ICEs) across different regions of a CSP, in accordance with one or more embodiments. The GUI 600C includes an interactive map displaying ICE levels per region. Each region is represented by a color-coded dot, indicating ICE severity, e.g., green indicating low ICEs, orange indicating moderate ICEs, and red indicating high ICEs. Users can interact with the map to select a particular region to see its ICE metrics. For example, in response to user interaction with me-west1 region (Tel Aviv, Israel), a pop-up window is displayed to provide detailed ICE metrics for this region. The pop-up window shows that spot nodes ICE rate is 0.84%, and on-demand nodes ICE is 1%. For each region, there are multiple AZs. For example, here in me-west1 region, there are three AZs, me-west1-a, me-west1-b, me-west1-c, each has their corresponding spot ICE rate and on-demand ICE rate.

The GUI 600C also includes metric panels on the left. The panel displays average spot instance ICE rate and top three regions with the highest spot instance ICE rates. A top left panel also displays an average on-demand instance ICE rate and top three regions with the highest on-demand instance ICE rate. A bottom left panel displays total regions breakdown, including total 40 regions, and ICE distribution across regions, e.g., 0 region with low ICEs (0%), 29 regions with moderate ICEs (72.5%), and 11 regions with high ICEs (27.5%).

Figure 6D:
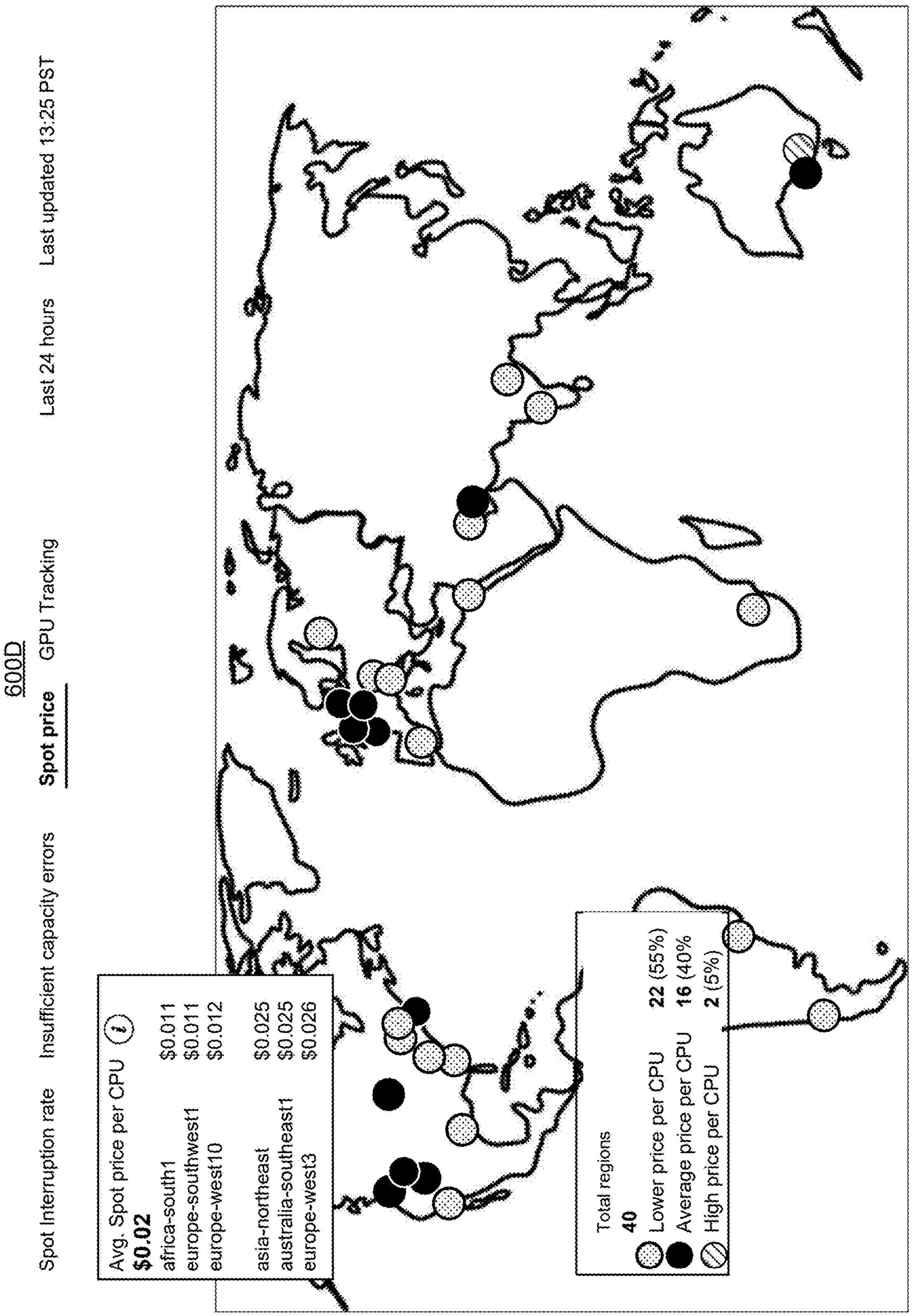

FIG. 6D illustrates an example GUI 600D displaying spot instance pricing per CPU across different GCP regions, in accordance with one or more embodiments. The GUI 600D includes an interactive map displaying spot CPU prices per region. Each region is represented by a color-coded dot, e.g., green indicating low spot price per CPU, orange spot indicating average spot price per CPU, and red spot indicating high spot price per CPU. In response to users interacting with a specific region, a pop-up window is displayed providing spot pricing for the specific region. For example, as illustrated, a user interacted with the me-west1 region (Tel Aviv, Israel), the spot pricing for this region including all AZs in the region is displayed.

The GUI 600D also includes panels on the left. Top left panel displays average spot price per CPU and top three regions with the lowest and highest spot prices. Bottom left panel displays total monitored regions and spot price distribution across regions, e.g., 22 regions with low price per CPU, 16 regions with average price per CPU, and 2 regions with high price per CPU.

Figure 6E:
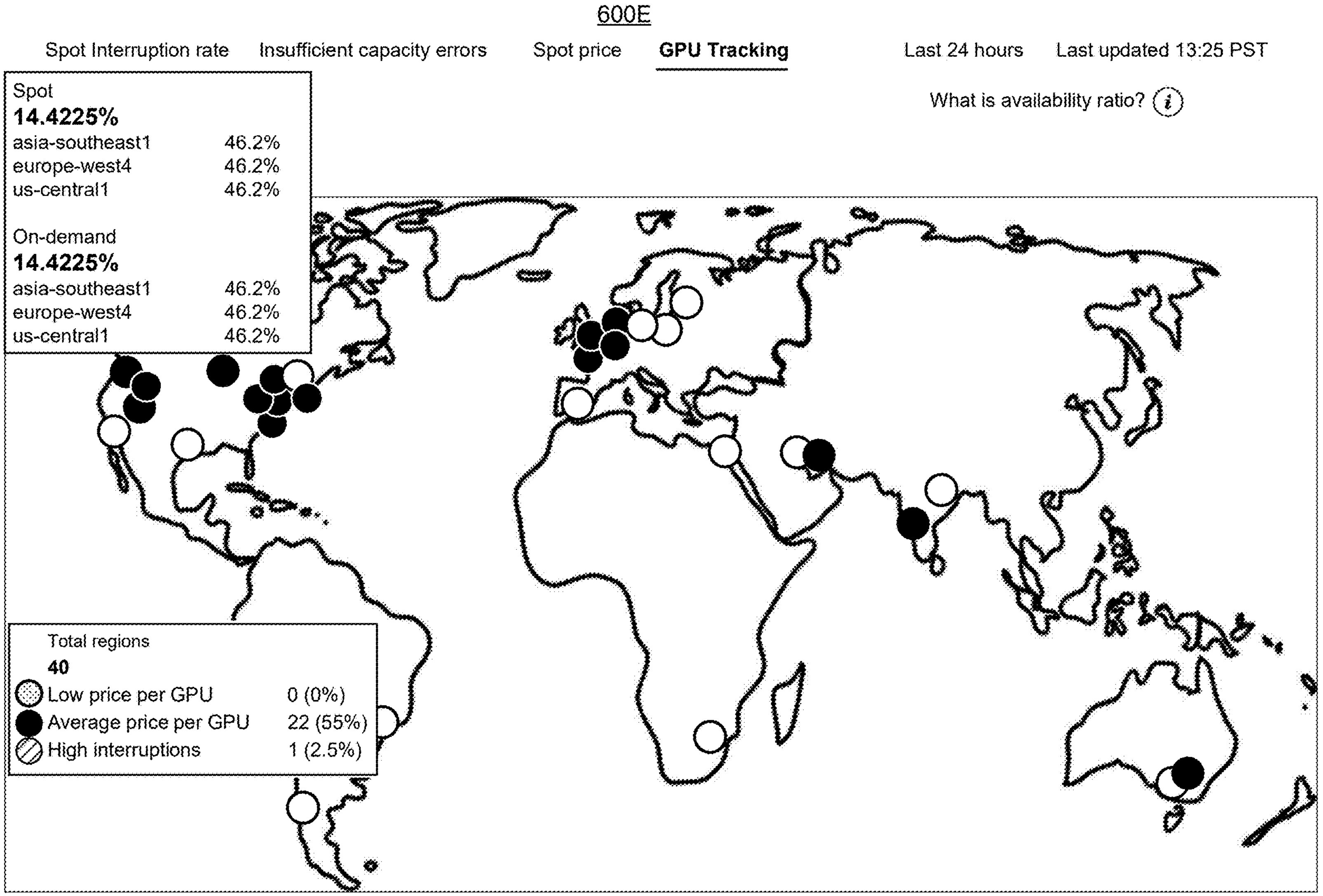

FIG. 6E illustrates an example GUI 600E displaying GPU availability and pricing across different GCP regions, in accordance with one or more embodiments. The GUI 600E includes an interactive map displaying GPU availability and pricing across cloud regions. Each region is represented by a color-coded dot, e.g., green indicating low GPU pricing (more affordable), orange indicating average GPU pricing, and red indicating high GPU pricing (scarce availability). Users can interact with each region to see the region's GPU stats. In response to user interacting with a specific region, a popup window is displayed, presenting the region's GPU availability ratio and pricing breakdown for different GPUs under on-demand and spot instances. As illustrated, the asia-south1 region (Mumbai, India) is selected, and the popup window shows the availability ratio as 19.2%, and GPU pricing breakdown. The GPU pricing breakdown includes multiple different types of GPUs, such as H100 GPU, L4 GPU, and T4 GPU. The on-demand pricing for H100 GPU is $81.51, and spot pricing for H100 GPU is $57.49, and so on.

The GUI 600E also includes panels on the left displaying various metrics. A top left panel shows an overall spot GPU availability rate and top three regions with the highest availability; and an overall on-demand GPU availability rate and regions with the highest availability. A bottom left panel displays total monitored regions and GPU price distribution across regions, e.g., 0 region with low price per GPU, 22 regions with average price per GPU, and 1 region with high price per GPU.

Example Method for Collecting and Processing Data Related to Spot Instances

Figure 7:
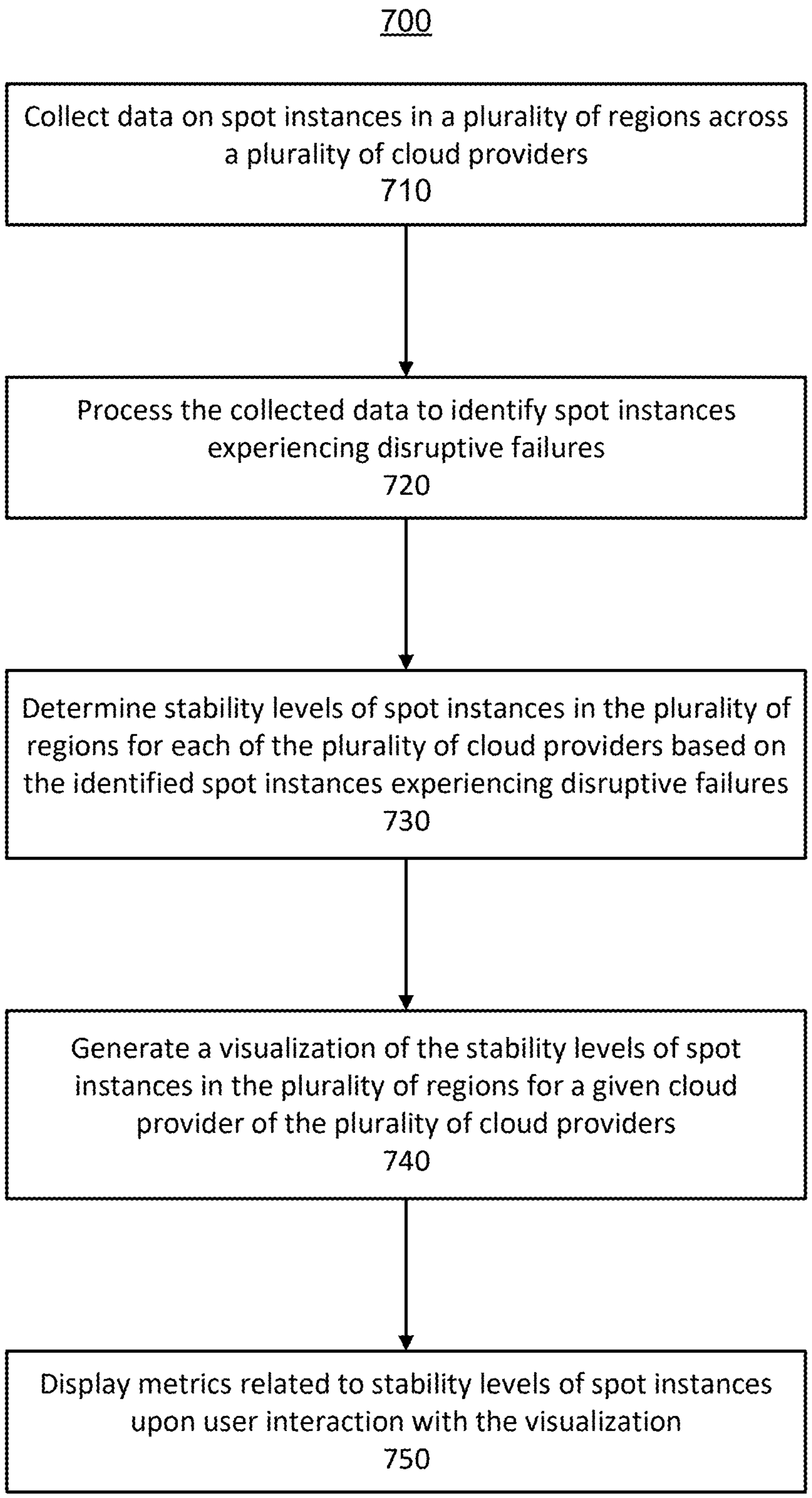
FIG. 7 is a flowchart of one embodiment of a method for collecting and processing data related to spot instances and generating a heatmap based on the processed data in accordance with one or more embodiments.

FIG. 7 is a flowchart of one embodiment of a method 700 for collecting and processing data related to spot instances and generating a heatmap based on the processed data. In various embodiments, the method includes different or additional steps than those described in conjunction with FIG. 7. Further, in some embodiments, the steps of the method may be performed in different orders than the order described in conjunction with FIG. 7. The method described in conjunction with FIG. 5 may be carried out by the cloud region stability prediction system 110 in various embodiments, while in other embodiments, the steps of the method are performed by any online system capable of collecting and processing data related to spot instances.

The system 110 collects 710 data on spot instances in a plurality of regions across a plurality of cloud service providers. The collected data may include (but are not limited to) whether an instance is available at a particular time, whether a request for provision resource is rejected at a particular time, pricing of the instance, etc. In some embodiments, system 110 deploy agents on the spot instances across different regions and different cloud service providers to continuously monitor and collect the data and sends the collected data to system 110 periodically, such as every few seconds, every few minutes, etc.

The system 110 processes 720 the collected data to identify spot instances experiencing disruptive failures. The disruptive failures may include (but are not limited to) interruptions and failures in provisioning resources. In some embodiments, the collected data is serialized to time-series data, indicating times when interruptions occurred or times when failures in provisioning resources occurred. The system 110 extracts features from the time-series data to identify interruptions, provisioning failures, and/or other performance degradations. The features may include a number of interruptions that occurred in a rolling time window and/or a number of failures in provisioning resources in the rolling time window.

The system 110 determines 730 stability levels of spot instances in the plurality of regions for each of the plurality of cloud service providers based on the disruptive failures experienced on the spot instances. In some embodiments, the system 110 determines stability levels of spot instances based on the extracted features. In some embodiments, the machine learning model is trained over historical data associated with spot instances of the cloud service provider.

In some embodiments, the system 110 applies a machine-learning model to data collected during a historical time period to predict a capacity of spot instances in a region of a cloud service provider during a future time period. In some embodiments, the system 110 is also configured to recommend a particular region of a particular cloud platform for spot instances based on the determined stability levels and/or predictions.

The system 110 generates 740 a visualization of the stability levels of spot instances in the plurality of regions for a given cloud service provider of the plurality of cloud service providers. In some embodiments, the visualization is a map showing stability levels of the plurality of regions. In some embodiments, the map is a heatmap, a darker color indicating a higher instability level and a lighter color indicating a lower instability level, or vice versa. In some embodiments, the plurality of regions are not contiguous regions on the map; instead, they are discrete spots. In some embodiments, a size of each spot (e.g., a diameter of a circle) represents a number of availability zones or a number of instances that are provided in the corresponding region. In some embodiments, the system 110 is configured to analyze data collected during a rolling window to determine updated stability levels of spot instances across a plurality of regions for each of the plurality of cloud service providers and updates the visualization based on the updated stability levels. An example visualization is shown in FIG. 6A.

The system 110 displays 750 metrics related to stability levels of spot instances upon user interaction with the visualization. For example, a user may be able to use a mouse hover over a particular region, or click to select a particular region. Responsive to selecting the particular region, metrics related to a stability level of the selected region is displayed to the user.

Example Computing System

Figure 8:
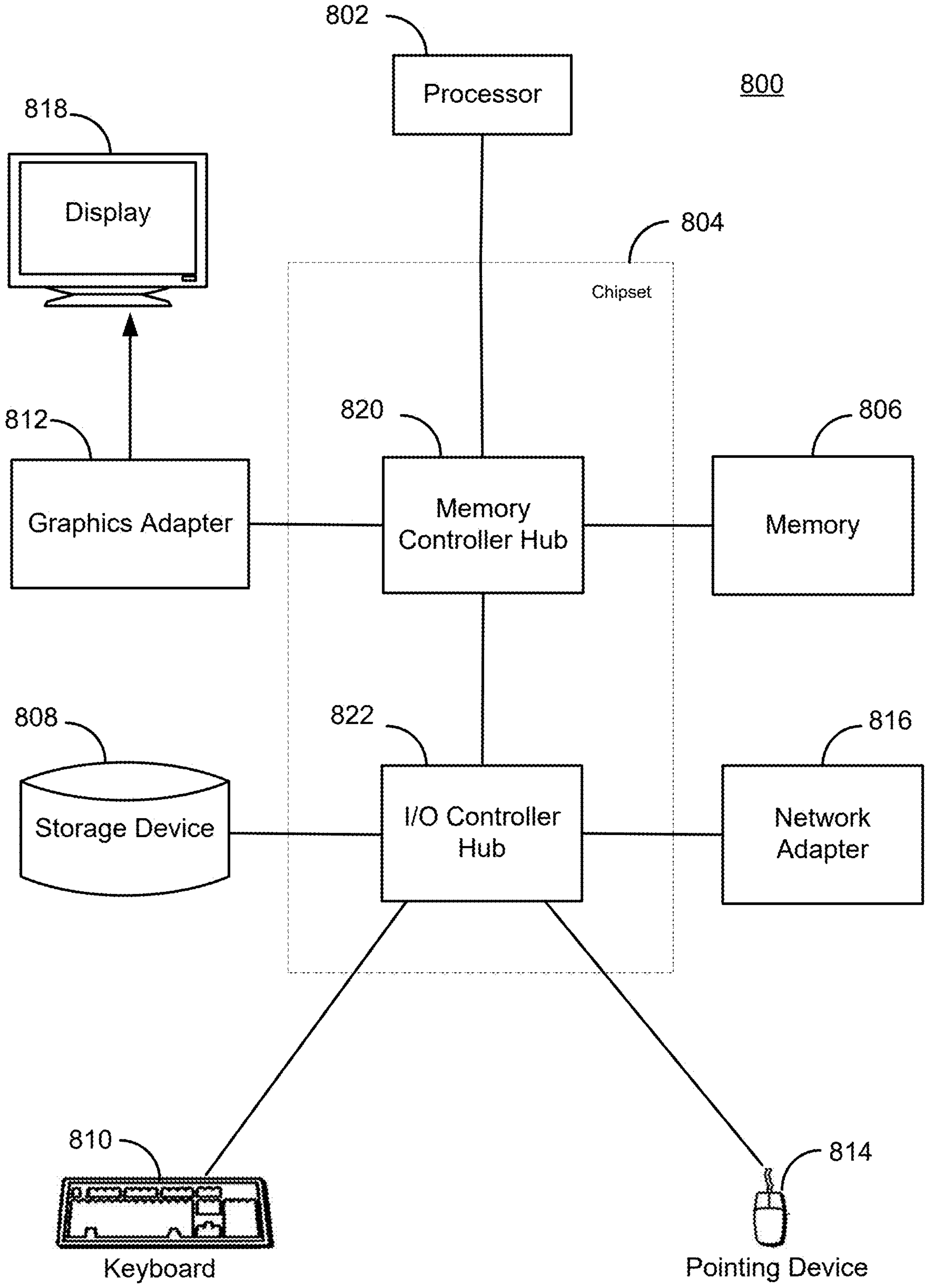
FIG. 8 is a block diagram of an example computer suitable for use in the networked computing environment of FIG. 1 in accordance with one or more embodiments.

FIG. 8 is a block diagram of an example computer 800 suitable for use in the networked computing environment 100 of FIG. 1. The computer 800 is a computer system and is configured to perform specific functions as described herein. For example, the specific functions corresponding to cloud region stability prediction system 110 or cloud service provider 120, 130 be configured through the computer 800.

The example computer 800 includes a processor system having one or more processors 802 coupled to a chipset 804. The chipset 804 includes a memory controller hub 820 and an input/output (I/O) controller hub 822. A memory system having one or more memories 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touchscreen, or other types of a pointing device and may be used in combination with the keyboard 810 (which may be an on-screen keyboard) to input data into the computer 800. The graphics adapter 812 displays images and other information on the display 818. The network adapter 816 couples the computer 800 to one or more computer networks, such as network 140.

The types of computers used by the entities and the AI automation system 80 of FIGS. 1 through 7 can vary depending upon the embodiment and the processing power required by the enterprise. For example, the AI automation system 80 might include multiple blade servers working together to provide the functionality described. Furthermore, the computers can lack some of the components described above, such as keyboards 810, graphics adapters 812, and displays 818.

ADDITIONAL CONSIDERATIONS

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for visualizing stability of spot instances in a cloud computing environment, comprising:
- collecting data on spot instances in a plurality of regions across a plurality of cloud service providers;
- processing the collected data to identify spot instances experiencing disruptive failures;
- determining stability levels of spot instances in the plurality of regions for each of the plurality of cloud service providers based on the identified spot instances experiencing disruptive failures;
- generating a visualization of the stability levels of spot instances in the plurality of regions for a given cloud service provider of the plurality of cloud service providers; and
- displaying metrics related to stability levels of spot instances in response to user interaction with the visualization.

2. The method of claim 1, wherein disruptive failures comprise interruptions or failures in provision requests.

3. The method of claim 1, wherein collecting data on spot instances comprises:
- deploying an agent to on each of the spot instances on the plurality of cloud service providers; and
- instructing the agent to collect corresponding data on a corresponding spot instance and send the collected data to an aggregator of the collected data.

4. The method of claim 1, wherein processing the collected data comprises:
- extracting features associated with disruptive failures from the collected data; and
- filtering the extracted features to identify spot instances experiencing interruptions or failures in provisioning requests.

5. The method of claim 4, wherein the features associated with interruptions comprise a timestamp, a spot instance associated with the interruption, and a reason for the interruption.

6. The method of claim 4, wherein the features associated with failures in provisioning requests comprise: a timestamp of a refusal of a provisioning request, a reason for the refusal of a provisioning request, and a resource type associated with the provisioning request.

7. The method of claim 1, further comprising:
- applying a machine-learning model to the data collected during a historical time period to predict a capacity of spot instances in a region of a cloud service provider during a future time period, wherein the machine-learning model is trained over historical data associated with spot instances.

8. The method of claim 1, further comprising recommending a particular region for a particular cloud service provider for spot instances based on the determined stability levels.

9. The method of claim 1, wherein analyzing the collected data comprises:
- periodically analyzing data collected during a rolling window to determine updated stability levels of spot instances across a plurality of regions for each of the plurality of cloud service providers; and
- updating the visualization based on the updated stability levels.

10. The method of claim 1, further comprising:
- collecting real time data associated with availability and stability of GPU instances across a plurality of regions of a plurality of cloud service providers; and
- determining a GPU availability ratio and interruption frequency for each of the plurality of regions of the plurality of cloud service providers based on the collected real time data.

11. The method of claim 10, further comprising:
- generating a visualization of GPU availability ratio and interruption frequency associated with GPU instances in the plurality of regions for a given cloud service provider of the plurality of cloud service providers; and displaying GPU availability ratio and interruption frequency of a region in response to user interaction with the region in the visualization.

12. A computing system comprising:

one or more processors; and a non-transitory computer-readable medium coupled with the one or more processors and comprising stored instructions, the instructions when executed by the one or more processors causes the one or more processors to:

collect data on spot instances in a plurality of regions across a plurality of cloud service providers;

process the collected data to identify spot instances experiencing disruptive failures;

determine stability levels of spot instances in the plurality of regions for each of the plurality of cloud service providers based on the identified spot instances experiencing disruptive failures;

generate a visualization of the stability levels of spot instances in the plurality of regions for a given cloud service provider of the plurality of cloud service providers; and display metrics related to stability levels of spot instances in response to user interaction with the visualization.

13. The computing system of claim 12, wherein disruptive failures comprise interruptions or failures in provision requests.

14. The computing system of claim 12, wherein collecting data on spot instances comprises:

deploying an agent to on each of the spot instances on the plurality of cloud service providers; and instructing the agent to collect corresponding data on a corresponding spot instance and send the collected data to an aggregator of the collected data.

15. The computing system of claim 12, wherein processing the collected data comprises:

extracting features associated with disruptive failures from the collected data; and filtering the extracted features to identify spot instances experiencing interruptions or failures in provisioning requests.

16. The computing system of claim 12, wherein the instructions further comprise instruction causing the one or more processors to:

apply a machine-learning model to the data collected during a historical time period to predict a capacity of spot instances in a region of a cloud service provider during a future time period, wherein the machine-learning model is trained over historical data associated with spot instances.

17. The computing system of claim 12, wherein the instructions further comprise instruction causing the one or more processors to:

collect real time data associated with availability and stability of GPU instances across a plurality of regions of a plurality of cloud service providers; and determine a GPU availability ratio and interruption frequency for each of the plurality of regions of the plurality of cloud service providers based on the collected real time data.

18. The computing system of claim 17, wherein the instructions further comprise instruction causing the one or more processors to:

generate a visualization of GPU availability ratio and interruption frequency associated with GPU instances in the plurality of regions for a given cloud service provider of the plurality of cloud service providers; and display a GPU availability ratio or an interruption frequency of a region in response to user interaction with the region in the visualization.

19. A non-transitory computer-readable medium, comprising stored instructions, the instructions when executed by one or more processors causes the one or more processors to:

collect data on spot instances in a plurality of regions across a plurality of cloud service providers;

process the collected data to identify spot instances experiencing disruptive failures;

determine stability levels of spot instances in the plurality of regions for each of the plurality of cloud service providers based on the identified spot instances experiencing disruptive failures;

generate a visualization of the stability levels of spot instances in the plurality of regions for a given cloud service provider of the plurality of cloud service providers; and display metrics related to stability levels of spot instances in response to user interaction with the visualization.

20. The non-transitory computer-readable medium of claim 19, wherein the instructions further comprise instruction causing the one or more processors to:

collect real time data associated with availability and stability of GPU instances across a plurality of regions of a plurality of cloud service providers; and determine a GPU availability ratio and interruption frequency for each of the plurality of regions of the plurality of cloud service providers based on the collected real time data.

* * * * *